United States Patent
Liu et al.

(10) Patent No.: US 12,219,110 B2
(45) Date of Patent: Feb. 4, 2025

(54) SECURITY PRINTING USING MIXED SPOT SIZES IN STOCHASTIC OR FREQUENCY MODULATED HALFTONE IMAGES

(71) Applicant: Xerox Corporation, Norwalk, CT (US)

(72) Inventors: Chu-heng Liu, Penfield, NY (US); Jorge A. Alvarez, Webster, NY (US); Douglas L. Herrmann, Webster, NY (US); Jason Matthew LeFevre, Penfield, NY (US); Seemit Praharaj, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/859,901

(22) Filed: Jul. 7, 2022

(65) Prior Publication Data

US 2024/0015258 A1     Jan. 11, 2024

(51) Int. Cl.
*H04N 1/32* (2006.01)
*G06K 15/10* (2006.01)

(52) U.S. Cl.
CPC ....... *H04N 1/32256* (2013.01); *G06K 15/102* (2013.01)

(58) Field of Classification Search
CPC .......................... H04N 1/32256; G06K 15/102
USPC ........................................ 358/3.28, 1.9, 1.15
See application file for complete search history.

(56) References Cited

U.S. PATENT DOCUMENTS

| | | | |
|---|---|---|---|
| 10,445,570 B2 | 10/2019 | Kawano | |
| 10,821,747 B1 | 11/2020 | Mieney et al. | |
| 10,882,347 B1 | 1/2021 | Robles Flores et al. | |
| 11,032,441 B2 | 1/2021 | Chapman | |
| 11,161,355 B1 | 11/2021 | McConville et al. | |
| 11,218,607 B1 | 1/2022 | Chapman | |
| 11,318,760 B2 | 5/2022 | Hoover et al. | |
| 2008/0303852 A1 | 12/2008 | Serra et al. | |
| 2013/0148168 A1* | 6/2013 | Bernal | G06T 1/0028 358/3.06 |
| 2014/0378585 A1 | 12/2014 | Li et al. | |
| 2015/0271364 A1 | 9/2015 | Chapman et al. | |
| 2015/0295898 A1 | 10/2015 | Tredoux et al. | |

(Continued)

FOREIGN PATENT DOCUMENTS

GB         2498617 A  *  7/2013  ............... G06T 1/00

OTHER PUBLICATIONS

InkJet Insight, "Xerox Announces Baltoro HF Inkjet Press," Jun. 26, 2019.

(Continued)

*Primary Examiner* — Quang N Vo
(74) *Attorney, Agent, or Firm* — Ortiz & Lopez, PLLC; Kermit D. Lopez; Luis M. Ortiz

(57) ABSTRACT

Methods and systems for securely rendering a security feature with image data to be printed, can involve providing within the image data, data relating to a group of spots, and within the image data, mixing spots of two or more spot sizes among the group of spots to embed information within a stochastic or frequency modulation halftone image. In an embodiment, operations may be implemented for rendering a part of the image with a first spot among the group of spots and a remaining portion of the image with a second spot among the group of spots, wherein the second spot is smaller in size than the first spot.

14 Claims, 10 Drawing Sheets

(56) References Cited

U.S. PATENT DOCUMENTS

2015/0332132 A1* 11/2015 Inamura .............. H04N 1/6022
 358/1.9
2020/0254762 A1 8/2020 Liu et al.

OTHER PUBLICATIONS

"Real-time computing," Wikipedia, Retrieved from "https://en.wikipedia.org/w/index.php?title=Real-time&oldid=989942190", page last edited on Nov. 21, 2020, at 21:56 (UTC).
"Xerox® BaltoroTM HF Inkjet Press. Inkonomics Amplified," Graphic Communications, Xerox Corporation, 2020.

* cited by examiner

SECURITY PRINTING USING MIXED SPOT SIZES IN STOCHASTIC OR FREQUENCY MODULATED HALFTONE IMAGES

TECHNICAL FIELD

Embodiments are related to image processing methods, systems, and devices. Embodiments also relate to printing devices and techniques. Embodiments further relate to the field of security printing. Embodiments also relate to methods, systems, and devices for modulation of the mixing of various drop sizes to embed information within a printed image. Embodiments further relate to security printing facilitated by the modulation of the mixing of drop sizes.

BACKGROUND

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples can be found in prescriptions, contracts, documents, coupons, and tickets. Typically, several specialty-imaging techniques may be used at various positions in a document. In addition, these security elements may in some cases conflict with the overall aesthetics of the document.

Examples of specialty imaging include, but are not limited to, features such as the Xerox® MicroText Mark, Xerox® Correlation Mark, Xerox® GlossMark®, Xerox® Infrared Mark and Xerox® Fluorescent Mark, which add security to static and variable information (VI) jobs by making it difficult to counterfeit them. Using multiple effects—including visible ones—on an application makes reproducing it more costly than purchasing the original. Specialty imaging can also be used to add visual interest and sophistication to print jobs. Specialty imaging may also be used to add reflective text to enhance photos, illustrations and colored backgrounds.

Conventional digital printing systems offer many of the above specialty security features (e.g., Glossmark, specialty toners (e.g., IR, UV, fluorescent), etc.). Many of these features, however, are not readily available for inkjet printing systems. For example, specialty ink requires new development. Furthermore, Glossmark technology does not work on inkjet systems. There is thus a continuing need for a different kind of security features/technology that can improve the security level of a digital printed document.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide for improved image process methods and systems It is another aspect of the embodiments to provide for improved methods and systems for security printing.

It is a further aspect of the embodiments to provide methods and systems for the modulation of the mixing of various drop sizes to embed information within a printed image.

It is yet another aspect of the embodiments to provide for methods and systems for security printing with the modulation of the mixing of ink drop sizes.

It is also an aspect of the embodiments to provide for security printing using mixed spot sizes in stochastic or FM halftone images.

The aforementioned aspects and other objectives and advantages can now be achieved as described herein. In an embodiment, a method of printing an image of a uniform patch, can be implemented wherein the uniform patch has an appearance of a uniform halftone, the uniform patch having at least a first region and a second region, wherein the first region comprises a first relative proportion of spots of a first size and spots of a second size, and the second region comprises a second relative proportion of spots of the first size and spots of the second size. The method can involve: using switch data associated with a hidden image to distinguish between the first region and the second region; and the switch data causing modulation of one of amplitude or frequency of spots in print data associated with at least one region.

In an embodiment, a method of securely rendering a security feature with image data to be printed, can involve: providing within the image data, data relating to a plurality of spots, and within the image data, mixing spots of at least two spot sizes among the plurality of spots to embed information within a stochastic or FM (frequency modulated) halftone image.

An embodiment can further involve rendering a part of the image with a first spot among the plurality of spots and a remaining portion of the image with a second spot among the plurality of spots, wherein the second spot is smaller in size than the first spot.

An embodiment can also involve rendering the image using two states including a first state and a second state, wherein the first state among the two states utilizes larger sized spots as compared to the second state during a halftone rendering of the image and controlling a contrast of the rendering of the image according to differences in a mixing ratio of larger spots with respect to smaller spots among the plurality of spots.

An embodiment can further involve: controlling by a contone image, a continuous modulation of the mixing of the varying spot sizes among the plurality of spots to embed the information within the stochastic or FM halftone image as a continue image.

In an embodiment, the plurality of spots can include more than two spots, wherein the more than two spots can be used to create differentiations in the mixing.

An embodiment can also involve detecting the embedded information by capturing an image of the embedded information and processing the image to reveal a hidden security mark in the embedded information.

An embodiment can further involve: capturing video containing the embedded image, and then decoding the video of the embedded image. The decoded image containing the embedded image can be displayed on a display screen associated with a reading device (e.g., a smartphone).

In another embodiment, a method of securely rendering a security feature in an image printed with digital image data, can involve: printing the image with an ink-jet printer; placing on a print sheet a plurality of drops; and printing with at least two drop sizes among the plurality of drops to embed information within a stochastic or FM halftone image.

An embodiment can further involve rendering a part of the image with a first drop among the plurality of drops and a remaining portion of the image with a second drop among the plurality of drops, wherein the second drop is smaller in size than the first drop.

An embodiment may also involve: rendering the image using two states including a first state and a second state, wherein the first state among the two states utilizes larger sized drops as compared to the second state during a halftone rendering of the image; and controlling a contrast of the rendering of the image according to differences in a mixing ratio of larger drops with respect to smaller drops among the plurality of drops.

An embodiment can further involve controlling by a contone image, a continuous modulation of the mixing of the varying drop sizes among the plurality of drops to embed the information within the stochastic or FM halftone image as a continue image.

In an embodiment, the plurality of drops can comprise more than two drops, wherein the more than two drops are used to create differentiations in the mixing.

In an embodiment, a method of reading a security feature within a printed image, the printed image comprising at least one of a stochastic halftone image or a frequency modulated (FM) halftone image, the printed image including intermixed pluralities of spots of at least two spot sizes, can involve: detecting embedded information in the image by capturing an image of the embedded information with a reading device; and processing the image to reveal a hidden security mark in the embedded information.

In an embodiment, a method of reading a security feature with a printed image, the printed image comprising at least one of a stochastic halftone image or a frequency modulated (FM) halftone image, the printed image including image data related to a plurality of spots, the image data including intermixed pluralities of spots of at least two spot sizes, can involve: capturing the image data with a reading device, the image data including embedded information; and displaying on a display screen, a decoded image containing the embedded information.

In an embodiment, a system for securely rendering a security feature with image data to be printed, can involve: at least one processor and a memory, the memory storing instructions to cause the at least one processor to perform: providing within the image data, data relating to a plurality of spots; and within the image data, mixing spots of at least two spot sizes among the plurality of spots to embed information within a stochastic or FM halftone image.

In an embodiment, a system for securely rendering a security feature in an image printed with digital image data, can involve: at least one processor and a memory, the memory storing instructions to cause the at least one processor to perform: printing the image with an ink-jet printer; placing on a print sheet a plurality of drops; and printing with at least two drop sizes among the plurality of drops to embed information within a stochastic or FM halftone image.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the embodiments.

DETAILED DESCRIPTION

Figure 1:
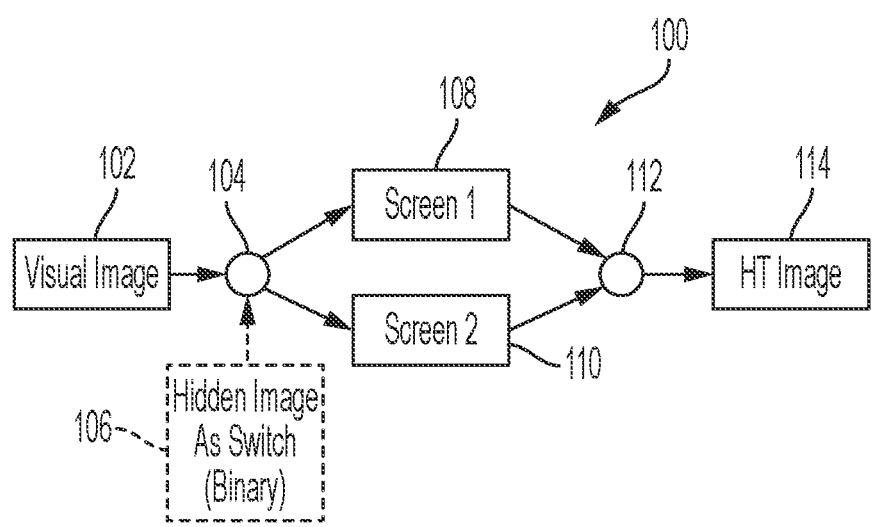
FIG. 1 illustrates a flow diagram depicting logical operational steps of a method of security printing involving screen switching, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" as utilized herein can relate to physical signals that can indicate or include information. The term "image" as utilized herein can relate to a pattern of physical light or a collection of data representing the physical light, and may include characters, words, and text as well as other features such as graphics.

An example of "data" includes "image data" which can comprise a number of pixels. Each pixel can correspond to a defined location in the image. Image data can include various color or gray levels. Each pixel of an image can be assigned a number representing the amount of light or gray level for that space or that particular spot, i.e., the shade of gray in the pixel. Binary image data has two possible values for each pixel, black or white, which are represented by a 1-bit value (1 for black, 0 for white). Image data may be defined in terms of a color space using values such as RGB (red, green, blue) or CMYK (cyan, magenta, yellow, black) or luminance and chrominance channels such as YCbCr or L*a*b. Images that have a large range of shades of grays are referred to as grayscale images.

When image data is provided by an image input device or terminal (IIT), such as a scanner, it may be received and/or processed to input binary or contone image data. When scanning, printing or copying image data, the image data often goes through a number of image processing operations such as, but not restricted to, scaling, color space conversion, filtering, rasterization (i.e., converting image data in vector graphics format or shapes into pixels for output on a printer), and/or a number of image manipulation operations, such as middle function operations (rotating, merging, annotating, etc.) for output The term "digital image" as utilized herein can be by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and can be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation can perform "image processing" when it operates on an item of data that relates to part of an image.

A digital color printing system is an apparatus arrangement suited to accepting image data and rendering that image data upon a substrate, such as, for example, a recording medium.

The "RGB color model" is an additive color model in which red, green, and blue can be added together in various ways to reproduce a broad array of colors. The name of the model comes from the initials of the three additive primary colors, red, green, and blue.

One purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value does not define the same color across devices without some kind of color management.

The "CMYK color model" can relate to a subtractive color model, which can be used in color printing, and can also be used to describe the printing process itself. CMYK refers to the four inks used in some color printing: cyan, magenta, yellow, and black.

The term "colorant" can refer to one of the fundamental subtractive C, M, Y, K, primaries, which may be realized in formulation as, liquid ink, solid ink, dye, or electrostatographic toner. A "colorant mixture" is a particular combination of C, M, Y, K colorants.

The term 'LAB' as utilized refer can relate to the CIELAB color space (also referred to as L*a*b*), which is a color space defined by the International Commission on Illumination in 1976. It expresses color as three values: L* for perceptual lightness, and a* and b* for the four unique colors of human vision: red, green, blue, and yellow. The term 'LAB' can be utilized interchangeably with L*a*b*.

The word "printer," the term "printing/copying/scanning system" and other similar terms such as "printing device" as used herein can encompass any device, apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine, and which may perform a print outputting function for any purpose. A digital color printing system is an example of a printer or printing system. Both a printer and a printing/copying/scanning system are examples of an image processing apparatus.

Note that as utilized herein, the word "printer" and the term "printing/copying/scanning system" and variations thereof can be utilized interchangeably to encompass any apparatus and/or system, such as a digital copier, image processing apparatus, xerographic and reprographic printing systems, bookmaking machine, facsimile machine, multi-function machine, ink-jet machine, continuous feed, sheet-fed printing device, etc., which may contain a print controller and a print engine, and which may perform a print outputting function for any purpose.

Figure 11:
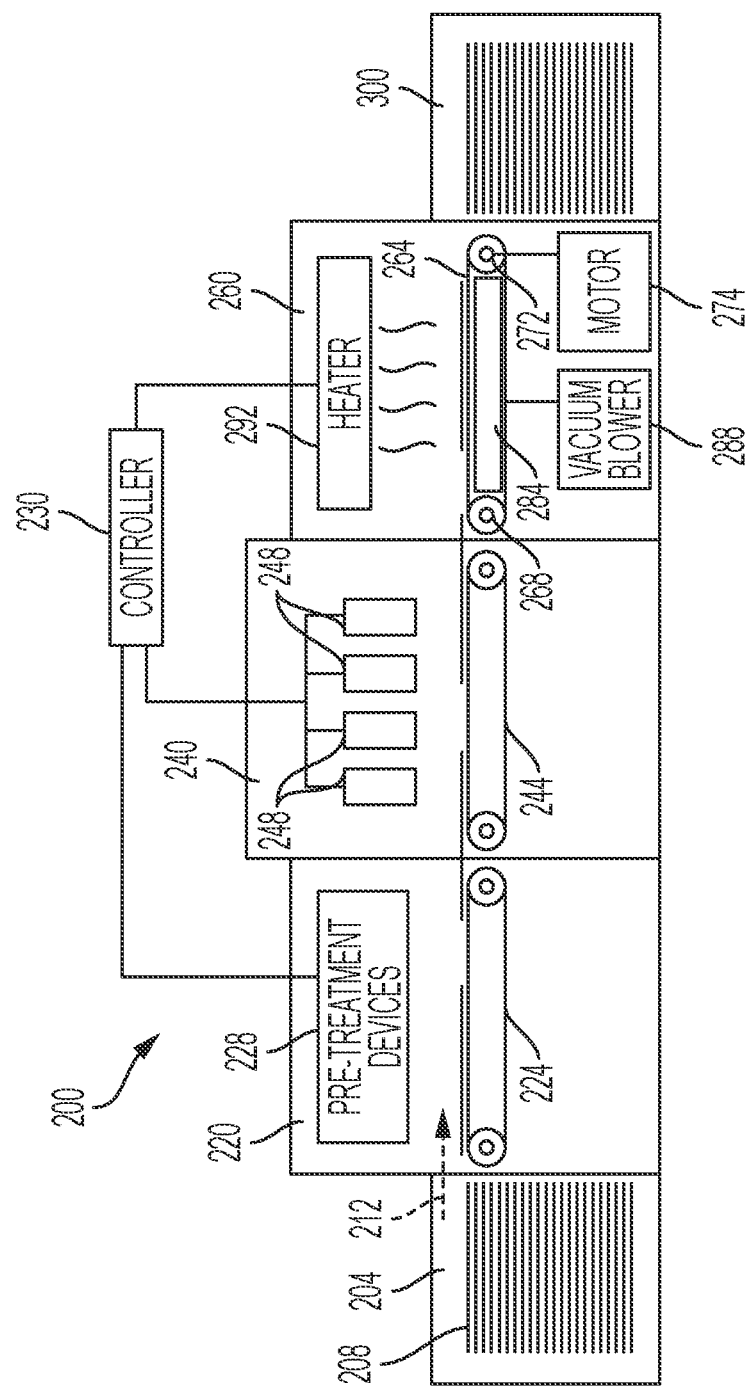
FIG. 11 illustrates a schematic diagram of a printer implemented as an aqueous ink printing system, which may be used to render images subject to inkjet security printing based on the modulation of the mixing of drop sizes, in accordance with an embodiment.

One example of a printer or printing system, which may be used in accordance with one or more embodiments is the aqueous printer 200, shown in FIG. 11. Another example of a printer or printing system, which may be used in accordance with one or more embodiments is the printing device 400 depicted in FIG. 12.

An image on printed matter may be represented by a halftone screen (a pattern of small dots). The term halftone (HT) relates to a reprographic technique that can simulate continuous tone images. Halftoning algorithms can be used to create a binary representation of a continuous tone image. Different types of printers may utilize different types of halftone methodologies that may be a good fit to the printer technology.

For example, inkjet printing mechanisms can use moveable cartridges, also called pens, that can use one or more printheads formed with very small nozzles through which drops of liquid ink (e.g., dissolved colorants or pigments dispersed in a solvent) are fired. To print an image, the carriage traverses over the surface of the print medium, and the ink ejection elements associated with the nozzles can be controlled to eject drops of ink at appropriate times pursuant to command of a microcomputer or other controller. The pattern of pixels on the print media resulting from the firing of ink drops can result in the printed image. Note that the terms 'drop' and 'spot' as utilized herein may be utilized interchangeably with one another to refer to a similar feature. These terms, however, may also relate to different features. For example, a drop may be an ink drop, which can be deposited on media. A spot, on the other hand, may be a spot of ink deposited on media. Thus, a 'spot' may be an ink spot, as opposed a 'drop', which may be an ink drop.

As discussed previously, in traditional offset printing and xerographic printing, security printing using different dot sizes for AM (amplitude modulation) halftones have been implemented. This form of security printing, however, does not work with inkjet systems because a stochastic or FM screen is used.

Some inkjet printing systems offer two physical drop sizes, for example, 4.5 pl and 2.0 pl. Although a main objective is to improve image quality, this new capability will enable additional functions. Security printing is one of these desired functions. The embodiments can thus use the level of drop size mixing to embed security marks in, for example, an inkjet halftone image.

As will be discussed in greater details below, embodiments may be implemented which use the modulation of the mixing of various drop sizes to embed information within a printed image. In its simplest form, two drop sizes can be used: a big drop can be used to render part of the image while a small drop can be used to render the rest of the image. Note that the term 'modulation' and similarly, 'modulating', as utilized herein, can relate to a process that can involve beginning with spots (e.g., one or more spots) of a given size in image data associated with an image, and modulating or changing the size of a subset of the spot(s). Modulation and modulating can also relate to the mixing of spots within the image data of two or more spot sizes among a group of spots, so as to embed information within a stochastic or FM halftone image.

In a more sophisticated form, two drop sizes and a two state system can be used: one state can use more large drops (fewer small drops) compared to a second state during halftone rendering. The contrast can be controlled by the differences in the mixing ratio of big and small drops In yet a further sophisticated implementation of an embodiment, a continuous modulation of the mixing of the big and small drops can be controlled by a contone image; therefore, a contone image can be embedded. In another embodiment, more than two drop sizes may be used to create different mixing and modulation. Furthermore, the detection of the embedded image can be performed using, for example, a reading device (e.g., a smartphones or other types of computing devices having video/image capturing features). A photo taken by a reading device, for example, can be processed to reveal the hidden security mark. In another detection approach, a video captured by the reading device can be processed and the decoded image then displayed in real time on a display screen associated with the reading device.

Note that the term 'video' as utilized herein can relate to one or more images or a sequence of images processed electronically into an analog or digital format and displayed on a screen (e.g., a display screen) with sufficient rapidity as to create the illusion of motion and continuity. The term 'video' may also refer to a signal carrying such images. The term 'video' can also refer to digital video, which can be an electronic representation of moving visual images (video) in the form of encoded digital data. This is in contrast to analog video, which represents moving visual images in the form of analog signals. Digital video can comprise a series of digital images displayed in rapid succession, or may comprise a single digital image captured by, for example a reading device such as, for example, a smartphone.

The term 'video' as utilized herein can also relate to a video stream and video streaming, which can involve a continuous transmission of video files from a server to a client. Video streaming allows users to view videos online without having to download them. The term streaming can refer to the continual transmission of audio and video files from a server to a client. In video streams, content can be sent in a compressed form over the Internet and can be displayed by the viewer in real time. The media can be sent in a continuous stream of data and can be played as it arrives.

FIG. 1 illustrates a flow diagram depicting logical operational steps of a method 100 of security printing involving screen switching, in accordance with an embodiment. As shown in FIG. 1, a visual image 102 can be combined with a hidden image 106 as shown at block 104. The two HT screens 108 and 110 can be prepared (matched in density) with different compositions of small and large drops. The hidden image (binary) 106 may be used as a switch to select HT screen 108 or HT screen 110 for rendering part of the image. The image portions rendered by HT screen 108 or HT screen 110 can be combined as indicated at block 112 to form a final composite HT image 114 for, for example, an inkjet printer.

Note that the terms 'switch' and 'switching' as utilized herein can relate to switching between regions within an image, or between different halftone screens. These terms also relate to the use of switch data associated with a hidden image to distinguish between regions of an image or an image patch. This switch data can cause modulation of amplitude and/or frequency of spots in print data associated with these regions.

In the simplest form, HT screen 108 (screen 1) may use large drops only, while HT screen 110 (screen 2) uses small drops only. The contrast of the hidden image 106 may be the greatest, but image quality may suffer some losses. In a more covert implementation, slightly different compositions of the mixing of the drops can be used. Image quality degradation may be hardly noticeable. The hidden image 106 can be completely invisible to the naked eye and hardly noticeable under magnification. The images depicted in FIG. 2 demonstrate examples of these features.

Figure 2:
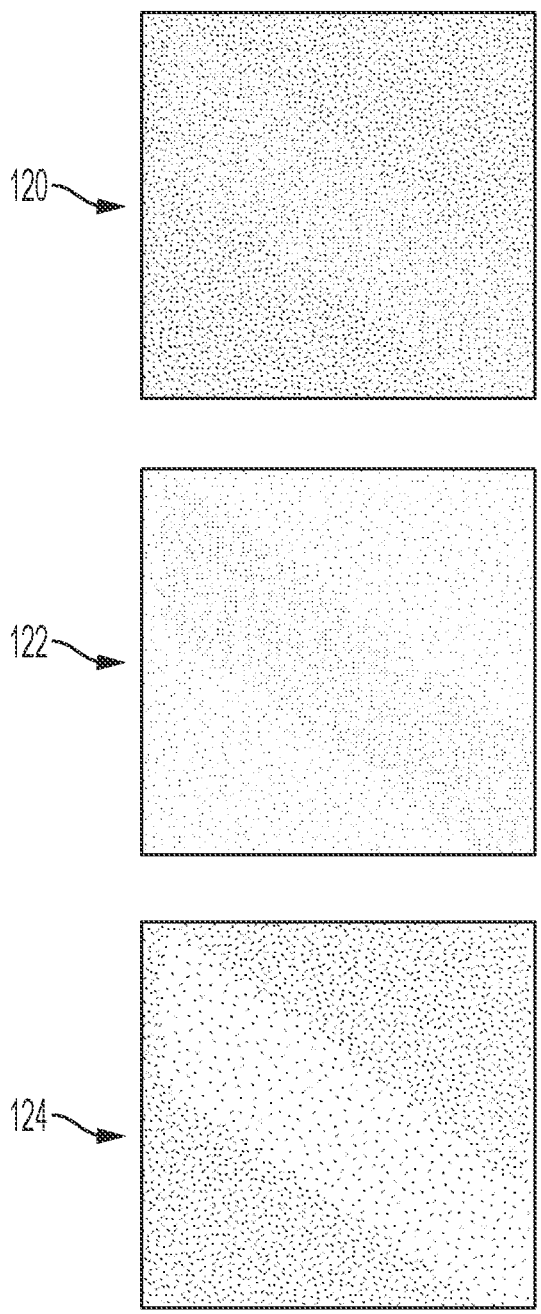
FIG. 2 illustrates a group of rendered images including a composite halftone image ready to be printed, an image that shows small ink drops only, and an image that depicts large drops only, in accordance with an embodiment.

FIG. 2 illustrates a group of rendered images 120, 122, and 124 including a composite halftone image ready to be printed, an image that shows small ink drops only, and an image that depicts large drops only, in accordance with an embodiment. The top image 120 is the composite HT image 114 ready to be printed. The large drop is represented by a black pixel while a small drop is shown as a gray pixel. The middle image 122 depicts the small drops only. The bottom image 124 shows the large drops only.

The diagonal stroke area has more small drops (less big drops) compared to the background area. The overall density is matched when printed. In addition, the border region shows no visible transition. As one skilled in the art will appreciate, the density matching and seamless transition are the two most important quality metric for a hidden image. With the drop size mixing modulation/switching, we have demonstrated both good attributes.

The HT bitmap image can be printed with CMK colors. In experimental embodiments, they all achieved great visual quality: density perfectly matched and no visible boundaries.

Note that there are generally two main types of halftones, namely FM (frequency modulated) halftones and AM (amplitude modulated) halftones. The disclosed embodiments can apply to FM halftones, in which printed spots are of one or a few distinct sizes. The rendering of different shade/gray levels can be achieved by varying the spatial density/frequency of the spots; hence, it can be referred to as an FM screen. The spatial frequency (or number of spots per unit area) is modulated by the desired shade/gray levels.

In the embodiments, when multiple distinct sized spots are available, we can take advantage of this extra degree of freedom provided by the choices of spot sizes to embed another image. As illustrated and discussed herein, the mechanism of this image embedding is yet a further step of spatial frequency modulation. For example, in areas with a given gray level, the halftones appear to be FM halftone. During the image embedding process, this same gray level can be rendered by at least two FM halftones: with different spot size mixing, modulated/controlled by the embedded image. This spot size mixing modulation is in fact also spatial frequency modulation in nature.

For example, if the selected (one of the two) halftone has a greater number of larger spots as compared to the other halftone, this halftone should have a larger average spot size, and therefore should possess a smaller number of spots per unit area in order to render the same gray level. As a result, this halftone with increasingly larger spots can have a lower spatial frequency. Therefore, we demonstrate that for any FM halftones (e.g., spatial frequencies are modulated by image gray level) when multiple distinct sized spots are available, the spatial frequencies can be further modulated by a secondary signal (e.g., a hidden image). This secondary frequency modulation can be achieved by a mixing of spots (or drops) of different sizes.

One or more embodiments can apply to any FM halftones when two or more distinct spot sizes are available/achievable. This is a "natural" process for inkjet because the spot sizes can be naturally related to the physical drop sizes. However, the embodiments can also work well for traditional printing applications (e.g., such as lithography). In these situations, spot sizes can be achieved by design. For example, with 4800 dpi design resolution/addressability, spots of 2400 dpi, 1600 dpi, 1200 dpi, 800 dpi or 600 dpi can be easily achieved.

In addition to the two main types of halftones, namely AM, FM halftones, there are various hybrid screens which can use frequency and amplitude modulations together. In some cases, the FM and AM can be used separately at different gray levels. For example, frequency modulation can be used at highlights to maintain minimally stable spot size. Amplitude modulation can be used at the mid-tones for better smoothness. In some applications, AM and FM can be applied simultaneously. This current invention applies whenever FM (modulation according to gray level) is present and a secondary FM (same gray level, but spatial frequency is further modulated) can be used to embed additional information.

As we have shown that the modulation of the mixing of spots of different sizes can lead to frequency modulation, this implies that image processing/filtering methods that can differentiate two spatial frequencies can be used or combined to detect the embedded image. For example: high pass, low pass, band pass or notch filters. Other common filters such as blur (e.g., low pass), sharpening (e.g., high pass) are also frequency selective and can be used or combined with one another and/or other filtering techniques to provide the desired functions. Of course, methods that can count the spots or direct detection of the spatial frequencies can also be effective.

Figure 3:
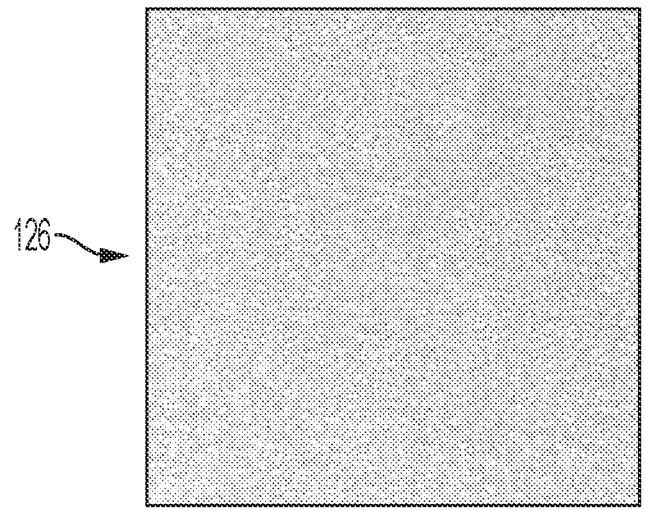
FIG. 3 illustrates an image that can be captured at close distances, and without any external optics, in accordance with an embodiment.

FIG. 3 illustrates an image 126 of a portion of the image that can be captured by a at close distances, and without any external optics, in accordance with an embodiment. The dimensions of the example image 126 depicted in FIG. 3 are about 10 mm×10 mm. It should be appreciated that these dimensions and any other specific parameters discussed herein are exemplary and illustrative in nature and should not be considered as limiting features of the embodiments. Furthermore, it can be appreciated that the image shown in FIG. 3 may be a uniform patch or a part of a complex image and can be captured by a reading device such as, for example, an image capturing device (e.g., digital camera, digital video camera, etc.), which may be included as part of or in association with a reading device such as, for example, a smartphone, tablet computing device, and so on. Note that in some embodiments, a uniform patch of the image 126 may be printed with one technology, for example, (e.g., lithography) and the spots described herein can be with another technology (e.g., ink-jet printing, or other printing technologies).

Figure 4:
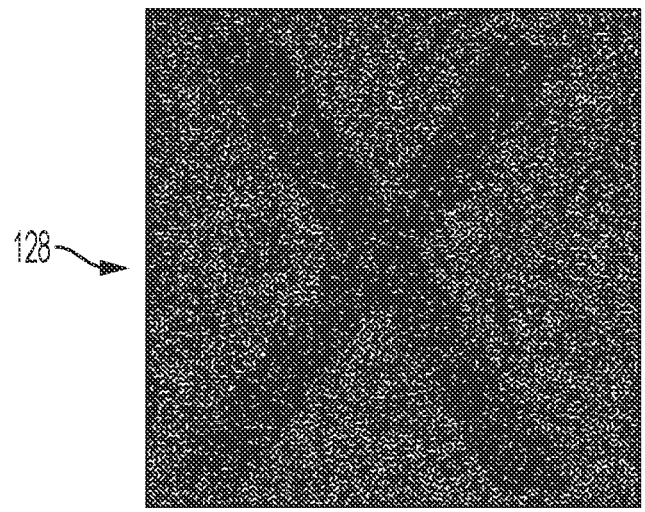
FIG. 4 illustrates an image subject to filtering and density adjustment to reveal a hidden image, in accordance with an embodiment.

Image processing with simple filtering and density adjustment can reveal the hidden image. FIG. 4 illustrates an image 128 that is the result of bandpass filtering (left image) and subsequent smoothing. As one can see, the image decoding can be accomplished with very simple conventional image filters.

Figure 5:
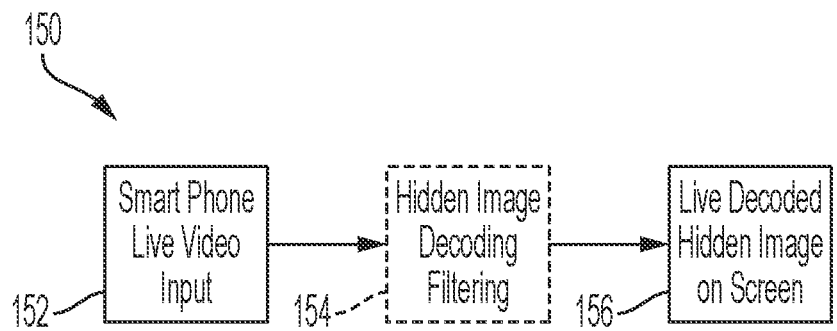
FIG. 5 illustrates a flow diagram depicting logical operational steps of a method of image capturing and decoding, in accordance with an embodiment.

FIG. 5 illustrates a flow diagram depicting logical operational steps of a method 150 of image capturing and decoding, in accordance with an embodiment. The image processing that is being used in the above decoding process can involve image filtering. A smartphone (e.g., iPhone) or another type of reading device (e.g., a "tablet" computing device having a digital camera), can be used to capture the image. It is quite feasible that a majority of current modern smartphones can be configured to accomplish image capture and decoding in real time, in accordance with one or more embodiments.

In a preferred embodiment of the decoding, a digital camera associated with a reading device can be used to capture video of the image, as shown at block 152. Real time decoding/filtering, as indicated at block 154, can produce the decoded image and present a live stream of decoded video on the reading device's screen. Decoding can thus be accomplished, as depicted at block 156.

Note that the term 'real time' (also referred to as 'real-time' or 'realtime') as utilized herein can relate to various operations in computing or other processes that can guarantee response times within a specified time (e.g., a deadline), usually a relatively short time. A real-time process is generally one that happens in defined time steps of maximum duration and fast enough to affect the environment in which it occurs, such as inputs to a computing system. Example of 'real time' include real-time computing and so-called live streaming (e.g., continuously delivering multimedia in real time). A 'live' video stream is an example of live or real time video streaming. For reading devices such as mobile imaging devices (e.g., smartphones), an immediate display following what the camera has captured is important for a satisfactory user experience. It is important that only a sufficiently high frame rate can give the user a sense of a "live" (or real time) feeling because the image appears to follow the movement of the camera. In a preferred embodiment, a frame rate greater than, for example, 10 fps, or 30 fps or even 120 fps, can be achieved.

Figure 6:
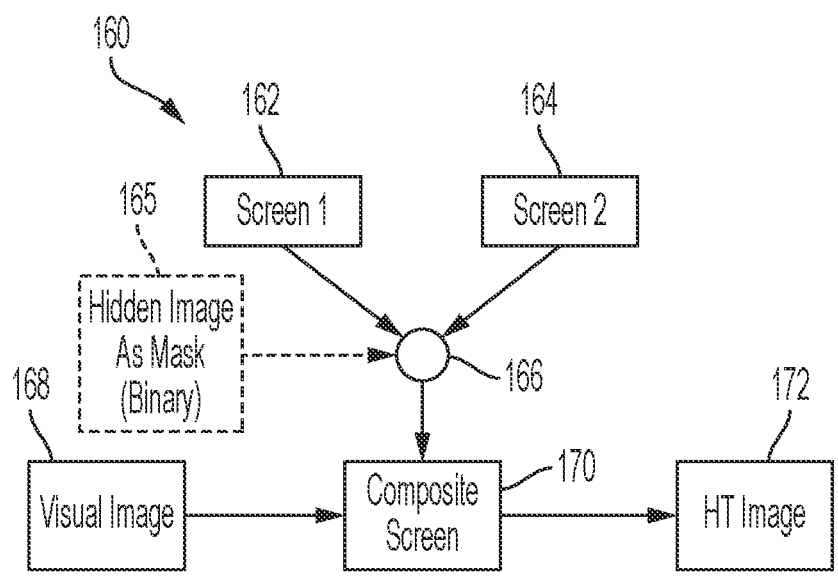
FIG. 6 illustrates a flow diagram depicting logical operational steps of a method for using an input hidden image as a mask to form a composite screen, in accordance with an embodiment.

In an alternative embodiment, as depicted in FIG. 6, the same encoding result can be achieved by a slightly different workflow. FIG. 6 illustrates a flow diagram depicting logical operational steps of a method 180 for using an input hidden image as a mask to form a composite screen, in accordance with an embodiment.

In the implementation depicted in FIG. 6, an input hidden image 165 can be used as a mask to form a composite screen. An HT screen 162 (screen 1) and an HT screen 164 (screen 2) can be combined, as shown at block 166, with the input hidden image 165. The composite screen 170 will have the hidden image 165 embedded. The visual image 168 can run through this composite screen 170 to produce a bitmap HT image 172.

In contrast to the embodiment illustrated in FIG. 1, the implementation depicted in FIG. 6 may be more suitable for hidden images that do not change frequently. For example, a company's logo, or an authentication phrase such as "authenticated" and so on, can be generated and stored in memory (computer memory) first. This screen with a hidden image embedded therein can then be used to render any input images efficiently, for example, applying the same screen (and the same hidden image) to all pages of a book. In addition, this composite screen can be much smaller than a full page in size.

For example, a 1 in×1 in square might be sufficient to embed a company's logo. This small unit of screen can be used as a tile to render a full page image with many of the same embedded images appear in a periodic fashion. This "tile" of screen with the embedded image may be only slightly larger than a conventional stochastic screen. A remarkable advantage of this embodiment is that this tile can be generated offline and can replace the existing screens in the memory of the current workflow/system without any modification to either hardware or software.

Figure 7:
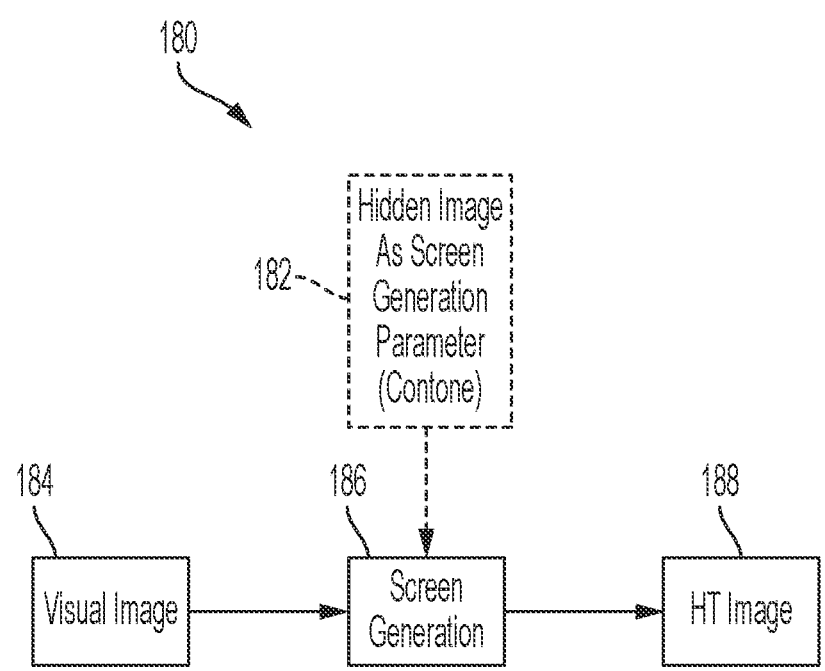
FIG. 7 illustrates a flow diagram depicting logical operational steps of a method of continuous screen modulation, in accordance with an embodiment.

The embodiments discussed above can be extended to a few distinct screens (e.g., 3, 5 or small n). A more challenging (and more secure) variation may involve implementing a continuous modulation of the screen. The modulation proposed by this approach can be very easily extended to continuous levels. FIG. 7 demonstrates the flow of the process. FIG. 7 illustrates a flow diagram depicting logical operational steps of a method 180 of continuous screen modulation, in accordance with an embodiment.

As shown in FIG. 7, a visual image 184 can be subject to screen generation 186. A hidden image 182 used as a screen generation parameter (e.g., contone) can also be subject to screen generation 186. A result of the screen generation can be the HT image 188.

The hidden image 182 can be a contone image and the pixel has a continuous value. The hidden image 182 can be used as a continuous variable to control the characteristics of the HT screen. This value can be used to control/modulate the mixing of big and small drops, for example the relative weighting of drops at two different sizes. In a more specific implementation, we can simply use the contone pixel value to modulate the big drop onset threshold value of the stochastic screen.

Figure 8:
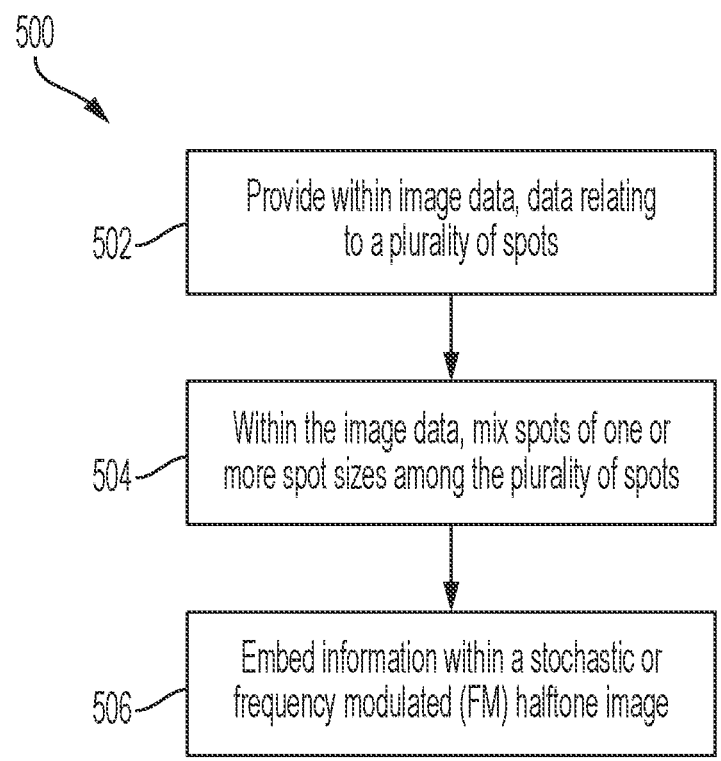
FIG. 8 illustrates a flowchart of operations depicting logical operational steps of a method for creating image data to be printed, in accordance with an embodiment.

FIG. 8 illustrates a flowchart of operations depicting logical operational steps of a method 500 of creating image data to be printed, in accordance with an embodiment. The method 500 shown in FIG. 8 can involve operations for securely rendering a security feature with image data to be printed. As shown at block 502, a step operation can be implemented to provide within the image data, data relating to a plurality of spots. An example of this operation is shown in FIG. 1, wherein a visual image 102 may be combined with a hidden image 106. As discussed previously, the two HT screens 108 and 110 can be prepared (matched in density) with different compositions of small and large drops. The hidden image (binary) 106 may be used as a switch to select HT screen 108 or HT screen 110 for rendering part of the image. As noted previously, the image portions rendered by HT screen 108 or HT screen 110 can be combined to form a final composite HT image 114 for printing. Variations to the above are also presented herein with respect to the operations depicted and described in FIG. 2 to FIG. 7.

Thereafter, as depicted at block 504 in FIG. 8, a step or operation can be implemented to, within the image data, mix spots of two or more spot sizes among the plurality of spots to then, as shown at block 506, embed information within an image comprising one or more a stochastic halftone image or a frequency modulated (FM) halftone image, as discussed previously herein. Examples of these mixing and embedding operations have already been described herein. For example, as discussed previously, for any FM halftones (e.g., spatial frequencies are modulated by image gray level) when multiple distinct sized spots are available, the spatial frequencies can be further modulated by a secondary signal (e.g., a hidden image). This secondary frequency modulation can be achieved by the mixing of spots (or drops) of different sizes.

Figure 9:
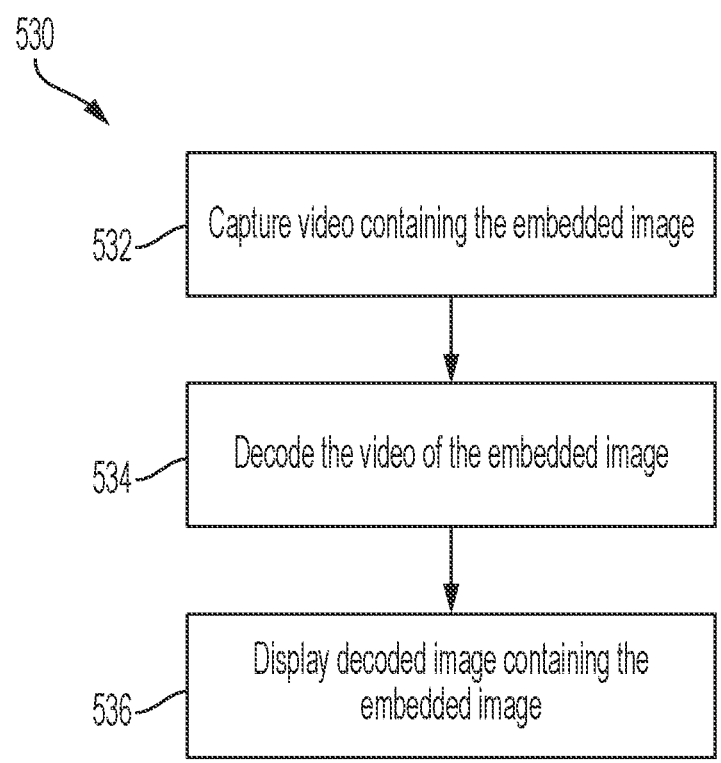
FIG. 9 illustrates a flowchart of operations depicting logical operational steps of a method for reading/decoding the security mark, in accordance with an embodiment.

FIG. 9 illustrates a flowchart of operations depicting logical operational steps of a method 530 for reading/decoding the security mark, in accordance with an embodiment. The method 530 shown in FIG. 9 can be implemented after, for example, implementation or processing of the previously discussed operations involved in the creation of the aforementioned image data. For example, prior to implementing the operations shown in FIG. 9, a printed image (or the image to be printed) may be created, which can include one or more of a stochastic halftone image or a frequency modulated (FM) halftone image. This printed image may include image data related to a plurality of spots, with the image data including intermixed pluralities of spots of two or more spot sizes, as discussed previously (e.g., FIGS. 1-4 and FIGS. 6-7).

Thus, as shown at block 532 in FIG. 9, a step or operation can be implemented to capture video containing the embedded image. Examples of this step or operation were previously described herein. For example, see FIG. 5 and the discussion regarding a digital camera associated with a reading device, which can be used to capture video of the image, as shown at block 152 in FIG. 5.

Following processing of the operation indicated at block 532 of FIG. 9, a step or operation can be implemented to decode the video of the embedded image, as shown at block 534. Thereafter, as indicated at block 536, a step or operation can be implemented to display the decoded image containing the embedded image. An example of the aforementioned decoding operation is discussed herein with respect to FIG. 4. That is, decoding may involve filtering and density adjustment to reveal a hidden image. In FIG. 4, for example, the image 128 is the result of bandpass filtering and subsequent smoothing. Thus, the decoding operation depicted at block 534 in FIG. 4 decoding may be accomplished with very simple image filters. Another example of the aforementioned decoding feature is discussed herein with respect to FIG. 5, wherein time decoding/filtering, as indicated at block 154 of FIG. 5, can produce the decoded image and present a live stream of decoded video on the reading device's screen.

Figure 10:
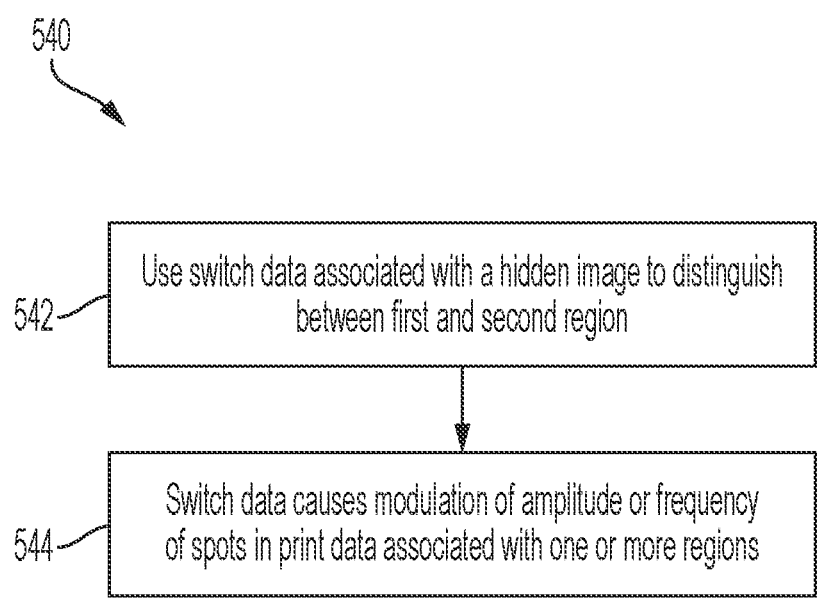
FIG. 10 illustrates a flow chart of operations depicting logical operational steps of a method of printing an image of a uniform patch, the uniform patch having an appearance of a uniform halftone, the uniform patch having at least a first region and a second region, in accordance with an embodiment.

FIG. 10 illustrates a flow chart of operations depicting logical operational steps of a method 540 of printing an image of a uniform patch, the uniform patch having an appearance of a uniform halftone, the uniform patch having at least a first region and a second region, in accordance with an embodiment. Note that in the embodiment depicted in FIG. 10, the first region can include a first relative proportion of spots of a first size and spots of a second size, and the second region can include a second relative proportion of spots of the first size and spots of the second size.

As shown at block 542, a step or operation can be implemented to use switch data associated with a hidden image to distinguish between the aforementioned first region and second region. Thereafter, as shown at block 544, a step or operation can be implemented in which the switch data causes modulation of one of amplitude or frequency of spots in print data associated with one or more of the aforementioned first and second regions.

FIG. 11 illustrates a schematic diagram of an example of an aqueous printer 200, which may be used to render images subject to inkjet security printing based on the modulation of the mixing of drop sizes, in accordance with an embodiment. The aqueous printer 200 may be, for example, an inkjet printer.

The aqueous printer 200 can be configured to print images on substrates carried by a media transport belt configured to work with a vacuum system to hold media substrates against the belt. The printer 200 can include a media supply 204, a pretreating unit 220, a marking unit 240, a drying unit 260, and a media receptacle 300. The media supply 204 can store a plurality of media sheets 208 for printing by the printer 200. The media sheets 208 may, in some embodiments, be clay-coated or other types of treated paper.

The pretreating unit 220 can include at least one transport belt 224, which can receive the media sheets 208 from the media supply 204 and transport the media sheets 208 in a process direction 212 through the pretreating unit 220. The pretreating unit 220 can include one or more pretreating devices 228 that condition the media sheets 208 and prepare the media sheets 208 for printing in the marking unit 240. The pretreating unit 220 may include, for example, one or more of coating devices that apply a coating to the media sheets 208, a drying device that dries the media sheets 208, and a heating device that heats the media sheets 208 to a predetermined temperature. In some embodiments, the printer 200 does not include a pretreating unit 220 and media sheets 208 are fed directly from the media supply 204 to the marking unit 240. In other embodiments, the printer 200 may include more than one pretreating unit.

The marking unit 240 can include at least one marking unit transport belt 244 that receives the media sheets 208 from the pretreating unit 220 or the media supply 204 and transports the media sheets 208 through the marking unit 240. The marking unit 240 further includes at least one printhead 248 that ejects aqueous ink onto the media sheets 208 as the media sheets 208 are transported through the marking unit 240. In the illustrated embodiment, the marking unit 240 includes four printheads 240, each of which ejects one of cyan, magenta, yellow, and black ink onto the media sheets 208. The reader should appreciate, however, that other embodiments include other printhead arrangements, which may include more or fewer printheads, arrays of printheads, and the like.

With continued reference to FIG. 11, dryer 260 can include a media transport belt 264 that receives the media sheets 208 from the marking unit 240. The drying belt 264 is tensioned between an idler roller 268 and a driven roller 272, which is driven by an electric motor 274. The dryer 208 can be configured to expose the printed substrates to heat having an adequate temperature to remove the water and solvents in the aqueous ink on the substrates. To accomplish this goal, the media transport belt 264 in dryer 260 can be configured with the structure described in more detail below. The heater 292 can be positioned within the dryer 260 to direct heat toward the substrates passing through the dryer 208.

The heater 292 can include one or more arrays of various types of radiators of electromagnetic radiation, such as infrared (IR) radiators, microwave radiators, or more conventional heaters such as convection heaters. After passing through the dryer 260, the substrates can be carried by the belt 264 to the output tray 300. The pre-treating unit 220, the marking unit 240, and the dryer 260 can be operated by a controller 230. The controller can be configured with programmed instructions stored in a memory operatively connected to the controller so the controller 230 can perform functions in the printer by operating various printer components when the controller 230 executes the stored programmed instructions. Although only one controller is shown in FIG. 11 for simplicity, multiple controllers may be used for the various functions and these controllers can communicate with one another to synchronize the functions that they perform.

Note that the term "controller" as utilized herein may refer to a computing hardware device or a software program that can manage or direct the flow of data between two more entities. A controller may be a cards, microchips, or separate hardware devices for the control of a peripheral device. In a general sense, a controller can be thought of as something or someone that interfaces between two or more systems and can manages communications between them. In some instances, the term "controller" may refer to a "print controller" or "printer controller". In some embodiments, a controller may be or may include a processor or may function as a process or a combination of a controller and a processor. A processor may be an electrical component that can perform operations on an external data source, usually memory or some other data stream. A processor typically takes the form of a microprocessor, which can be implemented on, for example, a single metal-oxide-semiconductor integrated circuit chip.

Figure 12:
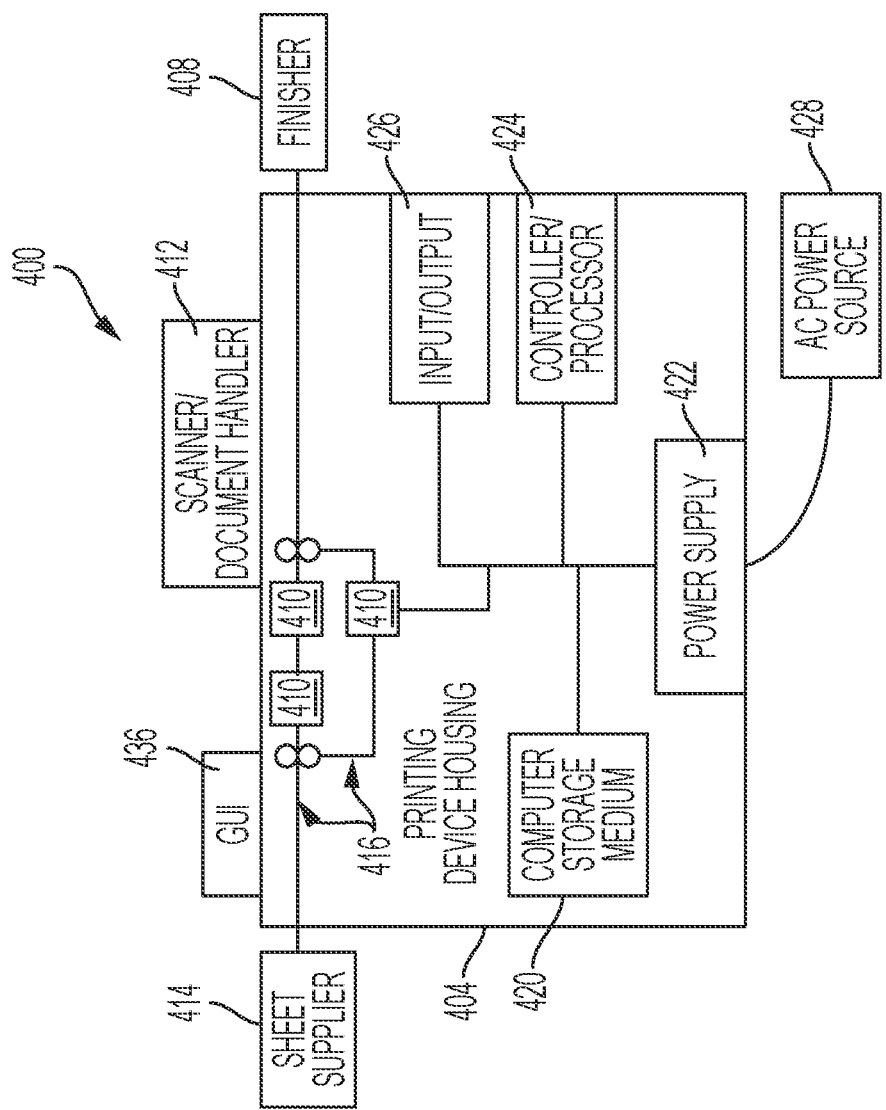
FIG. 12 illustrates a schematic diagram of a printing device that can be used to render images, in accordance with another embodiment.

FIG. 12 illustrates a schematic diagram a printing device 400, which can be implemented, in accordance with another embodiment. The printing device 400 can comprise, for example, a printer, a copier, a multi-function device, etc. In a preferred embodiment, the printing device 400 may be an inkjet printer. Specifically, the printing device 400 can comprise a housing 404 and, contained within the housing 404, multiple functional components including, but not limited to, a controller/processor 424, a communications port (i.e., an input/output device) 426, a memory (including, but not limited to, a non-transitory computer readable storage medium 420), at least one print media path 416, and at least one print engine 410 (i.e., at least one marking device) operatively connected (e.g., over a system bus).

The printing device 400 can further comprise multiple accessory functional components, such as a graphic user interface assembly 436, a sheet supplier 414, a document finisher 408 and a document handler 412, in communication with the controller/processor 424 (e.g., over the system bus). The multiple functional components, including any accessory functional components, can operate on power supplied from an alternating current (AC) source 428 via an internal power supply 422. This internal power supply 722 can comprise a power storage element (e.g., a battery, etc.).

The communications port (i.e., the input/output device) 426 can be used for communications between the printing device 400 and other computerized devices and/or printing devices on a network. The controller/processor 424 can control the various actions of the printing device 400. The non-transitory computer-readable storage medium 420 can comprise, for example, an optical storage device, a magnetic storage device, a capacitor-based storage device or any other suitable computer-readable storage device. This computer-readable storage device can be readable by the controller/processor 424 and can store instructions that the controller/processor 424 can execute to allow the printing device 400 to perform its various functions. The media path(s) 416 can be positioned to transport sheets of media from the sheet supplier 414 through the print engine(s) 410, as controlled by the controller/processor 424. After receiving various markings from the printing engine(s) 410, the sheets of media can be transmitted to an output tray (not shown) or, optionally, to the finisher 408, which can fold, staple, sort, etc., the various printed sheets.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The embodiments offer a number of unique features such as providing a hidden image with inkjet drop size mixing modulation, and the use of continuous modulation of the mixing of different drop sizes. The embodiments allow for security printing that is "native" to inkjet technology, along with hidden image decoding through filtering. Furthermore, the embodiments can provide for live decoding via a reading device, as discussed previously herein.

Benefits provided by the embodiments include security printing "native" to inkjet technology, and the ability to maintain very high visual image quality while embedding security marks. Additional benefits include the fact that no new materials development is required, and that some embodiments may implemented mostly through software implementation. An added benefit of the embodiments involves convenient smart phone decoding.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments.

The hardware used to implement the various illustrative logic/operations, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that may be specific to a given function.

In one or more exemplary aspects, the functions described can be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor.

By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

While various embodiments have been described above, it is understood that the specific order or hierarchy of blocks in the processes/flowcharts disclosed is an illustration of example approaches. Based upon design preferences, it is understood that the specific order or hierarchy of blocks in the processes/flowcharts may be rearranged. Furthermore, some blocks may be combined or omitted. The accompanying method claims present elements of the various blocks in a sample order and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Furthermore, the functionalities including operations, steps, blocks, features, elements and instructions described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the embodiments may take the form of a computer program product embodied in one or more non-ephemeral computer readable media having computer readable and/or executable program code embodied thereon. The methods and operations discussed herein with respect to FIG. 1 to FIG. 10, for example, may be implemented by various modules, circuits, and so on. Examples of such modules, circuits, etc. may be represented by the various operations and blocks depicted and described herein.

Although not required, the disclosed embodiments can be described in the general context of computer-executable instructions, such as program modules, being executed by a single computer. In most instances, a "module" (also referred to as an "engine") may constitute a software application but can also be implemented as both software and hardware (i.e., a combination of software and hardware).

Based on the foregoing, it can be appreciated that a number of embodiments are disclosed herein. For example, in an embodiment, a method of securely rendering a security feature with image data to be printed, can involve: providing within the image data, data relating to a plurality of spots; and within the image data, mixing spots of at least two spot sizes among the plurality of spots to embed information within an image comprising at least one of a stochastic halftone image or a frequency modulated (FM) halftone image.

An embodiment can involve rendering a part of the image with a first spot among the plurality of spots and a remaining portion of the image with a second spot among the plurality of spots, wherein the second spot is smaller in size than the first spot.

An embodiment can involve: rendering the image using two states including a first state and a second state, wherein the first state among the two states utilizes larger sized spots as compared to the second state during a halftone rendering of the image; and controlling a contrast of the rendering of the image according to differences in a mixing ratio of larger spots with respect to smaller spots among the plurality of spots.

An embodiment can involve controlling by a contone image, a continuous modulation of the mixing of the varying spot sizes among the plurality of spots to embed the information within the stochastic halftone image or the FM halftone image.

In an embodiment, the plurality of spots can comprise more than two spots, wherein the more than two spots are used to create differentiations in the mixing.

An embodiment can involve: detecting the embedded information by capturing an image of the embedded information; and processing the image to reveal a hidden security mark in the embedded information.

An embodiment can involve: capturing video containing the embedded image; decoding the video of the embedded image; and displaying on a display screen a decoded image containing the embedded image.

In an embodiment, a method of securely rendering a security feature in an image printed with digital image data, can involve: printing the image with an ink-jet printer; placing on a print sheet a plurality of drops; and printing with at least two drop sizes among the plurality of drops to embed information within an image comprising at least one of a stochastic halftone image or a frequency modulated (FM) halftone image.

An embodiment can involve rendering a part of the image with a first drop among the plurality of drops and a remaining portion of the image with a second drop among the plurality of drops, wherein the second drop is smaller in size than the first drop.

An embodiment can involve: rendering the image using two states including a first state and a second state, wherein the first state among the two states utilizes larger sized drops as compared to the second state during a halftone rendering of the image; and controlling a contrast of the rendering of the image according to differences in a mixing ratio of larger drops with respect to smaller drops among the plurality of drops.

An embodiment can involve: controlling by a contone image, a continuous modulation of the mixing of the varying drop sizes among the plurality of drops to embed the information within the stochastic halftone image or the FM halftone image.

In an embodiment, the plurality of drops can comprise more than two drops, wherein the more than two drops are used to create differentiations in the mixing.

An embodiment can involve: detecting the embedded information by capturing an image of the embedded information; and processing the image to reveal a hidden security mark in the embedded information.

An embodiment can involve: capturing video containing the embedded image; decoding the video of the embedded image in real time; and displaying on a display screen, a decoded image containing the embedded image on a display screen.

In an embodiment, a method of reading a security feature within a printed image, the printed image comprising at least one of a stochastic halftone image or a frequency modulated (FM) halftone image, the printed image including intermixed pluralities of spots of at least two spot sizes, can involve: detecting embedded information in the image by capturing an image of the embedded information with a reading device; and processing the image to reveal a hidden security mark in the embedded information.

In an embodiment, a method of reading a security feature with a printed image, the printed image comprising at least one of a stochastic halftone image or a frequency modulated (FM) halftone image, the printed image including image data related to a plurality of spots, the image data including intermixed pluralities of spots of at least two spot sizes, can involve: capturing the image data with a reading device, the image data including embedded information; and displaying on a display screen, a decoded image containing the embedded information.

An embodiment can involve decoding the image data of the embedded image in real time to obtain the decoded image.

In an embodiment, a system for securely rendering a security feature with image data to be printed, can include at least one processor and a memory, the memory storing instructions to cause the at least one processor to perform: providing within the image data, data relating to a plurality of spots; and within the image data, mixing spots of at least two spot sizes among the plurality of spots to embed information within an image comprising at least one of a stochastic halftone image or a frequency modulated (FM) halftone image.

In an embodiment, the instructions can be further configured for rendering a part of the image with a first spot among the plurality of spots and a remaining portion of the image with a second spot among the plurality of spots, wherein the second spot is smaller in size than the first spot.

In an embodiment, the instructions can be further configured for: rendering the image using two states including a first state and a second state, wherein the first state among the two states utilizes larger sized spots as compared to the second state during a halftone rendering of the image; and controlling a contrast of the rendering of the image according to differences in a mixing ratio of larger spots with respect to smaller spots among the plurality of spots.

In an embodiment, the instructions can be further configured for: controlling by a contone image, a continuous modulation of the mixing of the varying spot sizes among the plurality of spots to embed the information within the stochastic halftone image or the FM halftone image.

In an embodiment, the plurality of spots can include more than two spots, wherein the more than two spots are used to create differentiations in the mixing.

In an embodiment, the instructions can be further configured for: detecting the embedded information by capturing an image of the embedded information; and processing the image to reveal a hidden security mark in the embedded information.

In an embodiment, the instructions can be further configured for: capturing video containing video of the embedded image; decoding the video of the embedded image in real time; and displaying on a display screen, a decoded image containing the embedded image on a display screen.

In an embodiment, a system for securely rendering a security feature in an image printed with digital image data, can include at least one processor and a memory, the memory storing instructions to cause the at least one processor to perform: printing the image with an ink-jet printer; placing on a print sheet a plurality of drops; and printing with at least two drop sizes among the plurality of drops to embed information within an image comprising at least one of a stochastic halftone image or a frequency modulated (FM) halftone image.

In an embodiment, the instructions can be further configured for: rendering a part of the image with a first drop among the plurality of drops and a remaining portion of the image with a second drop among the plurality of drops, wherein the second drop is smaller in size than the first drop.

In an embodiment, the instructions can be further configured for: rendering the image using two states including a first state and a second state, wherein the first state among the two states utilizes larger sized drops as compared to the second state during a halftone rendering of the image; and controlling a contrast of the rendering of the image according to differences in a mixing ratio of larger drops with respect to smaller drops among the plurality of drops.

In an embodiment, the instructions can be further configured for: controlling by a contone image, a continuous modulation of the mixing of the varying drop sizes among the plurality of drops to embed the information within the stochastic halftone image or the FM halftone image as a continuous image.

In an embodiment, the plurality of drops can include more than two drops, wherein the more than two drops are used to create differentiations in the mixing.

In an embodiment, the instructions can be further configured for: detecting the embedded information by capturing an image of the embedded information; and processing the image to reveal a hidden security mark in the embedded information.

In an embodiment, the instructions can be further configured for: capturing video containing the embedded image; decoding the video of the embedded image in real time; and displaying on a display screen, a decoded image containing the embedded image on a display screen.

In an embodiment, a method of printing an image of a uniform patch, the uniform patch having an appearance of a uniform halftone, the uniform patch having at least a first region and a second region, wherein the first region comprises a first relative proportion of spots of a first size and spots of a second size, and the second region comprises a second relative proportion of spots of the first size and spots of the second size, can involve: using switch data associated with a hidden image to distinguish between the first region and the second region, wherein the switch data causes modulation of one of amplitude or frequency of spots in print data associated with at least one region.

An embodiment can further involve preparing the first region and the second region with different compositions of spots including small spots and large spots.

An embodiment can further involve using a hidden image to select the first region or the second region to print at least a part of the image.

An embodiment can further involve filtering and adjusting a density of the image to reveal the hidden image.

In an embodiment, filtering and adjusting a density of the image further involves bandpass filtering and subsequent smoothing of the image.

An embodiment can further involve forming the image as a final composite image for printing by combining portions rendered of the first region and the second region.

An embodiment can further involve embedding information with the image, wherein the image comprises at least one of a: stochastic halftone image or a frequency modulated halftone image.

An embodiment can further involve displaying a decoded image containing the embedded information in the image.

An embodiment can further involve presenting on a display screen of a reading device, a live stream containing decoded video containing the embedded information.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of securely rendering a security feature with image data to be printed, comprising:
   providing within the image data, data relating to a plurality of spots;
   within the image data, mixing spots of at least two spot sizes among the plurality of spots based on a level of drop size mixing with respect to the at least two spot sizes to embed information as a security feature within an image comprising at least one of a stochastic halftone image or a frequency modulated (FM) halftone image; and
   rendering the image with a printer.

2. The method of claim 1 wherein rendering the image further comprises: rendering a part of the image with a first spot among the plurality of spots and a remaining portion of the image with a second spot among the plurality of spots, wherein the second spot is smaller in size than the first spot.

3. The method of claim 1 wherein rendering the image further comprises:
   rendering the image using two states including a first state and a second state, wherein the first state among the two states utilizes larger sized spots as compared to the second state during a halftone rendering of the image; and
   controlling a contrast of the rendering of the image according to differences in a mixing ratio of larger spots with respect to smaller spots among the plurality of spots.

4. The method of claim 1 further comprising:
   controlling by a contone image, a continuous modulation of the mixing of the varying spot sizes among the plurality of spots to embed the information within the stochastic halftone image or the FM halftone image.

5. The method of claim 1 wherein the plurality of spots comprises more than two spots, wherein the more than two spots are used to create differentiations in the mixing.

6. The method of claim 1 further comprising:
   detecting the embedded information by capturing an image of the embedded information; and
   processing the image to reveal a hidden security mark in the embedded information.

7. The method of claim 1 further comprising:
   capturing video containing the embedded image;
   decoding the video of the embedded image; and
   displaying on a display screen a decoded image containing the embedded image.

8. A system for securely rendering a security feature with image data to be printed, comprising:
   at least one processor and a memory, the memory storing instructions to cause the at least one processor to perform:
   providing within the image data, data relating to a plurality of spots;
   within the image data, mixing spots of at least two spot sizes among the plurality of spots based on a level of drop size mixing with respect to the at least two spot sizes to embed information as a security feature within an image comprising at least one of a stochastic halftone image or a frequency modulated (FM) halftone image; and
   rendering the image with a printer.

9. The system of claim 8 wherein the instructions for rendering the image are further configured for rendering a part of the image with a first spot among the plurality of spots and a remaining portion of the image with a second spot among the plurality of spots, wherein the second spot is smaller in size than the first spot.

10. The system of claim 8 wherein the instructions are further configured for:
    rendering the image with the printer using two states including a first state and a second state, wherein the first state among the two states utilizes larger sized spots as compared to the second state during a halftone rendering of the image; and
    controlling a contrast of the rendering of the image according to differences in a mixing ratio of larger spots with respect to smaller spots among the plurality of spots.

11. The system of claim 8 wherein the instructions are further configured for:
    controlling by a contone image, a continuous modulation of the mixing of the varying spot sizes among the plurality of spots to embed the information within the stochastic halftone image or the FM halftone image.

12. The system of claim 8 the plurality of spots comprises more than two spots, wherein the more than two spots are used to create differentiations in the mixing.

13. The system of claim 8 wherein the instructions are further configured for:
    detecting the embedded information by capturing an image of the embedded information; and
    processing the image to reveal a hidden security mark in the embedded information.

14. The system of claim 8 wherein the instructions are further configured for:
    capturing video containing video of the embedded image;
    decoding the video of the embedded image in real time; and
    displaying on a display screen, a decoded image containing the embedded image on a display screen.

\* \* \* \* \*